US010626881B2

(12) United States Patent
Tanabe et al.

(10) Patent No.: US 10,626,881 B2
(45) Date of Patent: Apr. 21, 2020

(54) COMPRESSOR-IMPELLER FIXING NUT, IMPELLER ASSEMBLY, AND SUPERCHARGER

(71) Applicant: MITSUBISHI HEAVY INDUSTRIES, LTD., Tokyo (JP)

(72) Inventors: Yoshihiro Tanabe, Nagasaki (JP); Yasuhiro Wada, Nagasaki (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/078,279

(22) PCT Filed: Jan. 18, 2017

(86) PCT No.: PCT/JP2017/001487
§ 371 (c)(1),
(2) Date: Aug. 21, 2018

(87) PCT Pub. No.: WO2017/145582
PCT Pub. Date: Aug. 31, 2017

(65) Prior Publication Data
US 2019/0024670 A1   Jan. 24, 2019

(30) Foreign Application Priority Data

Feb. 22, 2016 (JP) ................. 2016-030711

(51) Int. Cl.
*F04D 29/26* (2006.01)
*F16B 37/00* (2006.01)
(Continued)

(52) U.S. Cl.
CPC ............ *F04D 29/266* (2013.01); *F02B 37/00* (2013.01); *F02B 39/00* (2013.01); *F04D 29/053* (2013.01);
(Continued)

(58) Field of Classification Search
CPC .......... F01D 5/043; F02B 37/00; F02B 39/00; F04D 29/053; F04D 29/266; F04D 29/28;
(Continued)

(56) References Cited

U.S. PATENT DOCUMENTS 4,053,261 A    10/1977  Pennig
5,163,816 A *  11/1992  Goetzke ................. F01D 5/025
                                                    416/204 A
(Continued)

FOREIGN PATENT DOCUMENTS

CN    101029655 A    9/2007
CN    203756591 U    8/2014
(Continued)

OTHER PUBLICATIONS

Machine translation of JP 2015-94355 A from Espacenet (Year: 2015).*

(Continued)

*Primary Examiner* — Justin D Seabe
*Assistant Examiner* — Christopher R Legendre
(74) *Attorney, Agent, or Firm* — Westerman, Hattori, Daniels & Adrian, LLP

(57) ABSTRACT

A compressor-impeller fixing nut has a tubular shape, and includes: a curved-surface shaped portion disposed in a first range from a first end side in an axial direction, the curved-surface shaped portion having an outer diameter which increases toward a second end side in the axial direction and including an outer peripheral surface having a curved shape which protrudes outward in a radial direction in a cross section along the axial direction; and a nut portion disposed in a second range closer to the second end side from the first range in the axial direction, the nut portion having an outer peripheral surface with a nut shape. An expression (D1max−D1min)/2<L is satisfied, where L is a length of the first range (Continued)

UPSTREAM SIDE ←——————→ DOWNSTREAM SIDE
AXIAL DIRECTION in the axial direction, and D1max is a maximum value and D1min is a minimum value of the outer diameter of the curved-surface shaped portion in the first range.

15 Claims, 8 Drawing Sheets

(51) Int. Cl.
*F02B 37/00* (2006.01)
*F02B 39/00* (2006.01)
*F04D 29/053* (2006.01)
*F04D 29/28* (2006.01)
*F01D 5/02* (2006.01)
*F16D 1/08* (2006.01)

(52) U.S. Cl.
CPC ........... *F04D 29/28* (2013.01); *F04D 29/284* (2013.01); *F16B 37/00* (2013.01); *F01D 5/025* (2013.01); *F05B 2220/40* (2013.01); *F05B 2260/301* (2013.01); *F05B 2220/40* (2013.01); *F05D 2260/31* (2013.01); *F16D 1/0894* (2013.01); *Y02T 10/144* (2013.01)

(58) Field of Classification Search
CPC ... F04D 29/284; F05B 2260/301; F16B 37/00
See application file for complete search history.

(56) References Cited

U.S. PATENT DOCUMENTS

| | | | | |
|---|---|---|---|---|
| 5,882,178 | A * | 3/1999 | Hudson | F04D 29/266 403/334 |
| 6,164,931 | A | 12/2000 | Norton et al. | |
| 6,481,970 | B2 * | 11/2002 | Mukherjee | F04D 25/04 416/204 A |
| 2003/0108428 | A1 | 6/2003 | Bosen | |
| 2012/0003093 | A1 | 1/2012 | Lischer et al. | |
| 2015/0219121 | A1 | 8/2015 | King | |
| 2015/0376963 | A1 * | 12/2015 | Orban | G01N 11/00 175/48 |
| 2016/0208682 | A1 * | 7/2016 | Naruoka | F02B 33/40 |
| 2016/0208820 | A1 | 7/2016 | Naruoka et al. | |
| 2019/0024670 | A1 * | 1/2019 | Tanabe | F02B 37/00 |

FOREIGN PATENT DOCUMENTS

| | | | | |
|---|---|---|---|---|
| FR | 1108299 | A * | 1/1956 | ............ F01D 5/025 |
| JP | 61-155696 | U | 9/1986 | |
| JP | 62-82302 | U | 5/1987 | |
| JP | 62-82303 | U | 5/1987 | |
| JP | 2011-122538 | A | 6/2011 | |
| JP | 5012730 | B2 | 8/2012 | |
| JP | 2015-94355 | A | 5/2015 | |
| WO | 2010/089028 | A1 | 8/2010 | |
| WO | 2015/072459 | A1 | 5/2015 | |

OTHER PUBLICATIONS

International Search Report dated Apr. 18, 2017, issued in counterpart application No. PCT/JP2017/001487, w/English translation. (5 pages).
Written Opinion dated Apr. 18, 2017, issued in counterpart application No. PCT/JP2017/001487, w/English translation. (6 pages).
Office Action dated Sep. 20, 2018; issued in counterpart Korean application No. 10-2018-7021959, with English tanslation. (14 pages).
Office Action dated Feb. 1, 2019, issued in counterpart CN application No. 201780011887.6, with English translation. (16 pages).
Extended (Supplementary) European Search Report dated Feb. 11, 2019, issued in counterpart EP application 17756024.0 (6 pages).
Office Action dated Oct. 8, 2019, issued in counterpart JP Application No. 2016-030711, with English translation. (8 pages).
Office Action dated Nov. 14, 2019, issued in counterpart EP Application No. 17756024.0. (3 pages).

* cited by examiner

UPSTREAM SIDE ←—————→ DOWNSTREAM SIDE
AXIAL DIRECTION

COMPRESSOR-IMPELLER FIXING NUT, IMPELLER ASSEMBLY, AND SUPERCHARGER

TECHNICAL FIELD

The present invention relates to a compressor-impeller fixing nut, an impeller assembly, and a supercharger.

BACKGROUND ART

A supercharger is widely used as an auxiliary device for obtaining high combustion energy in an internal combustion engine. For instance, an exhaust-turbine type supercharger (turbocharger) is configured to rotate a turbine rotor with exhaust gas of an internal combustion engine and rotate a compressor impeller with the motoring force of the turbine rotor, and thereby to compress air to be supplied to the internal combustion engine.

Generally, a compressor impeller is fixed to a shaft with a compressor-impeller fixing nut, and forms an impeller assembly with the compressor-impeller fixing nut and the shaft. In such an impeller assembly, the shaft includes a screw portion inserted through the compressor impeller, and the screw portion protrudes toward the upstream side of the compressor impeller in the axial direction. The compressor-impeller fixing nut is screwed with the screw portion, thereby fixing the compressor impeller to the shaft.

Patent Document 1 discloses attaching a bag-shaped seal cap to a tip portion of a shaft protruding from the compressor-impeller fixing nut, in order to prevent entry of water into a gap between the inner peripheral surface of a through hole of the compressor impeller and the outer peripheral surface of the shaft from the tip portion of the shaft.

Further, Patent Document 1 discloses forming the seal cap to have a curved surface shape that gradually becomes thinner toward the tip, in order to stabilize the flow of air to be introduced into the compressor impeller and enhance the compression efficiency of the supercharger.

CITATION LIST

Patent Literature

Patent Document 1: JP5012730B

SUMMARY

Problems to be Solved

While the air flow introduced into the compressor impeller can be stabilized by the seal cap of the supercharger disclosed in Patent Document 1, providing the seal cap increases the number of components, and the configuration becomes more complex. Further, it is necessary to attach the seal cap to the tip of the shaft after mounting the nut to the shaft, which increases the number of assembly steps, and the assembling works become more complex and laborious. As a result, the production cost and the maintenance cost would increase.

The present invention was made in view of the above problem, and an object is to provide a compressor-impeller fixing nut, as well as an impeller assembly and a supercharger including the compressor-impeller fixing nut, whereby it is possible to reduce energy loss of an air flow introduced into the compressor impeller without increasing the complexity of the configuration of the compressor impeller assembly.

Solution to the Problems (1) A compressor-impeller fixing nut for fixing a compressor impeller to a shaft, the compressor-impeller fixing nut having a tubular shape, according to at least one embodiment of the present invention, includes: a curved-surface shaped portion disposed in a first range from a first end side in an axial direction, the curved-surface shaped portion having an outer diameter which increases toward a second end side in the axial direction and including an outer peripheral surface having a curved shape which protrudes outward in a radial direction in a cross section along the axial direction; and a nut portion disposed in a second range closer to the second end side from the first range in the axial direction, the nut portion having an outer peripheral surface with a nut shape. An expression $(D1max-D1min)/2<L$ is satisfied, where L is a length of the first range in the axial direction, and D1max is a maximum value of the outer diameter of the curved-surface shaped portion in the first range and D1min is a minimum value of the outer diameter of the curved-surface shaped portion in the first range.

The compressor-impeller fixing nut of the above (1) is configured to be mounted to the tip side of the shaft inserted through the compressor impeller, and forms a compressor impeller assembly with the compressor impeller and the shaft.

In the compressor impeller assembly including the above compressor-impeller fixing nut (1), the air flowing along the axial direction to the compressor-impeller fixing nut flows along the outer peripheral surface of the curved-surface shaped portion from the first end side of the compressor-impeller fixing nut.

Herein, the curved-surface shaped portion of the above (1) is formed to have an outer diameter which increases toward the second end side of the compressor-impeller fixing nut in the axial direction (downstream side in the air flow direction of the compressor impeller assembly), and the outer peripheral surface of the curved-surface shaped portion in a cross section along the axial direction has a curved surface shape which protrudes outward in the radial direction. Thus, it is possible to guide the air flowing to the compressor-impeller fixing nut along the axial direction to the compressor impeller smoothly, along the outer peripheral surface of the curved-surface shaped portion.

Further, by satisfying an expression $(D1max-D1min)/2<L$, it is possible to further reduce the angle formed between the axial direction and a line connecting opposite ends of the outer peripheral surface of the curved-surface shaped portion in a cross section along the axial direction to be smaller than 45 degrees. Accordingly, it is possible to guide the air flowing to the compressor-impeller fixing nut along the axial direction to the compressor impeller smoothly, along the outer peripheral surface of the curved-surface shaped portion.

Accordingly, with the above compressor-impeller fixing nut (1), it is possible to guide the air flow that flows toward the compressor-impeller fixing nut along the axial direction smoothly to the compressor impeller without using a seal cap as disclosed in Patent Document 1. Thus, it is possible to reduce energy loss of an air flow introduced into the compressor impeller without increasing the complexity of the configuration of the compressor impeller assembly.

(2) In some embodiments, in the above configuration (1), an expression (D1max−D1min)/2<0.75 L is satisfied.

With the above compressor-impeller fixing nut (2) satisfying an expression (D1max−D1min)/2<0.75 L, it is possible to reduce the gradient of the outer peripheral surface of the curved-surface shaped portion with respect to the axial direction even further. That is, it is possible to further reduce the angle formed between the axial direction and a line connecting opposite ends of the outer peripheral surface of the curved-surface shaped portion in a cross section along the axial direction. Accordingly, it is possible to guide the air flowing to the compressor-impeller fixing nut along the axial direction to the compressor impeller smoothly, along the outer peripheral surface of the curved-surface shaped portion. Thus, it is possible to enhance the effect to reduce energy loss of an air flow introduced into the compressor impeller.

(3) In some embodiments, in the compressor-impeller fixing nut of the above (1) or (2), an expression D1min/D1max<0.75 is satisfied.

With the above compressor-impeller fixing nut (3), the outer peripheral surface satisfying the conditions of the above (1) is formed over a broader range in the radial direction. Accordingly, it is possible to guide the air flowing to the compressor-impeller fixing nut along the axial direction to the compressor impeller smoothly, along the outer peripheral surface of the curved-surface shaped portion. Thus, it is possible to enhance the effect to reduce energy loss of an air flow introduced into the compressor impeller.

(4) In some embodiments, in the compressor-impeller fixing nut according to any one of the above (1) to (3), the curved-surface shaped portion includes, on the first end side in the axial direction, a vertical end surface connecting to the outer peripheral surface and intersecting with the axial direction at a right angle.

With the above compressor-impeller fixing nut (4), when mounting the compressor-impeller fixing nut to the shaft, it is possible to make a mark such as a guide line easily on the vertical end surface, which makes it possible to understand the angle of rotation of the nut easily. Thus, it is possible to keep the tightening torque of the nut within a predetermined range easily, without using a torque measurement device such as a torque wrench.

(5) In some embodiments, in the compressor-impeller fixing nut according to the above (4), an expression H/T2min<0.3 is satisfied, where H is a height of the vertical end surface in the radial direction, and T2min is a minimum value of a thickness of the nut portion in the radial direction.

With the above compressor-impeller fixing nut (5), by satisfying an expression H/T2min<0.3, the outer peripheral surface of the curved-surface shaped portion satisfying the conditions of the above (1) is formed over a broader range in the radial direction. Thus, also with the configuration having the above vertical surface (4), it is possible to guide the air flowing to the compressor-impeller fixing nut along the axial direction to the compressor impeller smoothly, along the outer peripheral surface of the curved-surface shaped portion.

(6) In some embodiments, in the compressor-impeller fixing nut according to the above (4) or (5), the outer peripheral surface of the curved-surface shaped portion in a cross section along the axial direction includes: a first arc portion connecting to the vertical end surface and having a first curvature radius; and a second arc portion connecting to the first arc portion on a side opposite to the vertical end surface and having a second curvature radius which is greater than the first curvature radius.

With the above compressor-impeller fixing nut (6), with the compressor-impeller fixing nut according to the above (4) or (5), it is possible to smoothly connect the vertical end surface and the second arc portion having a relatively small gradient with respect to the axial direction, via the first arc portion having a relatively large gradient with respect to the axial direction. Accordingly, it is possible to guide the air flowing to the compressor-impeller fixing nut along the axial direction to the compressor impeller even more smoothly, along the outer peripheral surface of the curved-surface shaped portion.

(7) In some embodiments, in the compressor-impeller fixing nut according to the above (6), an existence range of the first arc portion in the axial direction is narrower than an existence range of the second arc portion in the axial direction.

With the above compressor-impeller fixing nut (7), the existence range of the second arc portion having a relatively small gradient with respect to the axial direction is larger than the existence range of the first arc portion having a relatively large gradient with respect to the axial direction, and thus it is possible further enhance the effect of the above (6) to guide the air flow smoothly to the compressor impeller along the outer peripheral surface of the curved-surface shaped portion.

(8) In some embodiments, the compressor-impeller fixing nut according to any one of the above (1) to (7) further includes a flange portion disposed closer to the second end side from the nut portion in the axial direction, the flange portion protruding outward in the radial direction.

With the above compressor-impeller fixing nut (8), when applied to the compressor impeller assembly, it is possible to reduce loss due to entry of air into the gap between the compressor impeller and the compressor-impeller fixing nut on the downstream side of the flange portion.

(9) In some embodiments, in the compressor-impeller fixing nut according to any one of the above (1) to (8), the outer peripheral surface of the nut portion in a cross section orthogonal to the axial direction includes at least a pair of sides which are parallel to one another.

As described above in the (9), the nut portion may include a regular hexagonal outer shape, which is a common nut shape, or a square outer shape, or an outer shape including two parallel sides connected with arcs. Accordingly, it is possible to screw the compressor-impeller fixing nut with the screw portion of the shaft by using a general fastening tool such as a wrench.

(10) A compressor impeller assembly according to at least one embodiment of the present invention includes: a compressor impeller; a shaft inserted through a hub of the compressor impeller, the shaft including a screw portion protruding toward an upstream side of the compressor impeller in an axial direction from the hub of the compressor impeller; and the compressor-impeller fixing nut according to any one of the above (1) to (9), configured to fix the compressor impeller to the shaft by being screwed with the screw portion.

According to the above compressor impeller assembly (10), since the above compressor-impeller fixing nut according to any one of the above (1) to (9) is provided, it is possible to reduce energy loss of an air flow introduced into the compressor impeller with a simple configuration, without using a seal cap as described in Patent Document 1.

(11) In some embodiments, in the compressor impeller assembly according to the above (10), the shaft includes a tip portion which protrudes opposite to the compressor impeller, from the compressor-impeller fixing nut.

With the above compressor impeller assembly (1), upon maintenance, it is possible to measure the rotational vibration (shaft vibration) of the shaft by causing a displacement sensor or the like to approach, or make contact with, the tip portion of the shaft protruding from the compressor-impeller fixing nut.

Further, while a seal cap needs to be removed before measuring the rotational vibration of the shaft if a bag-shaped seal cap is disposed on the tip portion of the shaft as in Patent Document 1, the above configuration (11) makes it no longer necessary to remove the seal cap, for the seal cap itself is not required, and thus measurement of the rotational vibration of the shaft is facilitated.

(12) In some embodiments, in the compressor impeller assembly according to the above (10) or (11), a recess portion is formed on an upstream end surface of the hub of the compressor impeller with respect to an axial direction. The compressor-impeller fixing nut includes: an accommodated portion disposed in a third range from the second end side in the axial direction and accommodated in the recess portion; and a flange portion disposed between the nut portion and the accommodated portion in the axial direction and protruding outward in the radial direction. An expression Dc>Dr is satisfied, where Dc is an outer diameter of the flange portion and Dr is an inner diameter of the recess portion.

With the above compressor impeller assembly (12), a part of the compressor-impeller fixing nut (the accommodated portion) is accommodated in the recess portion, and thus it is possible to reduce the length of the shaft. Further, since the flange portion has the outer diameter Dc larger than the inner diameter Dr of the recess portion, it is possible to suppress entry of air into the recess portion with the flange portion, and suppress energy loss of the air flow.

(13) In some embodiments, in the compressor impeller assembly according to the above (12), an expression Dc≤Dh is satisfied, where Dh is an outer diameter of an upstream end, with respect to the axial direction, of an outer peripheral surface of the hub in the compressor impeller.

With the above compressor impeller assembly (13), the flange portion does not protrude outward in the radial direction of the outer peripheral surface of the hub in the compressor impeller, and thus it is possible to reduce the effect of the flange portion on the air flow that flows toward the rotor blades of the compressor impeller along the axial direction.

(14) In some embodiments, in the compressor impeller assembly according to the above (12) or (13), a gap is disposed between the flange portion and the hub.

With the above compressor impeller assembly (14), with the gap, it is possible to suppress generation of stress due to the difference between the thermal expansion amount of the flange portion and the thermal expansion amount of the hub. Furthermore, even when the gap is provided, the inflow of air into the gap can be suppressed by the flange portion itself.

(15) A supercharger according to at least one embodiment of the present invention includes the compressor impeller assembly according to any one of the above (10) to (14).

According to the above supercharger (15), since the above compressor impeller assembly according to any one of the above (10) to (14) is provided, it is possible to reduce energy loss of an air flow introduced into the compressor impeller with a simple configuration, and achieve a high supercharging efficiency.

Advantageous Effects

According to at least one embodiment of the present invention, provided is a compressor-impeller fixing nut, as well as an impeller assembly and a supercharger including the compressor-impeller fixing nut, whereby it is possible to reduce energy loss of an air flow introduced into the compressor impeller without increasing the complexity of the configuration of the compressor impeller assembly.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
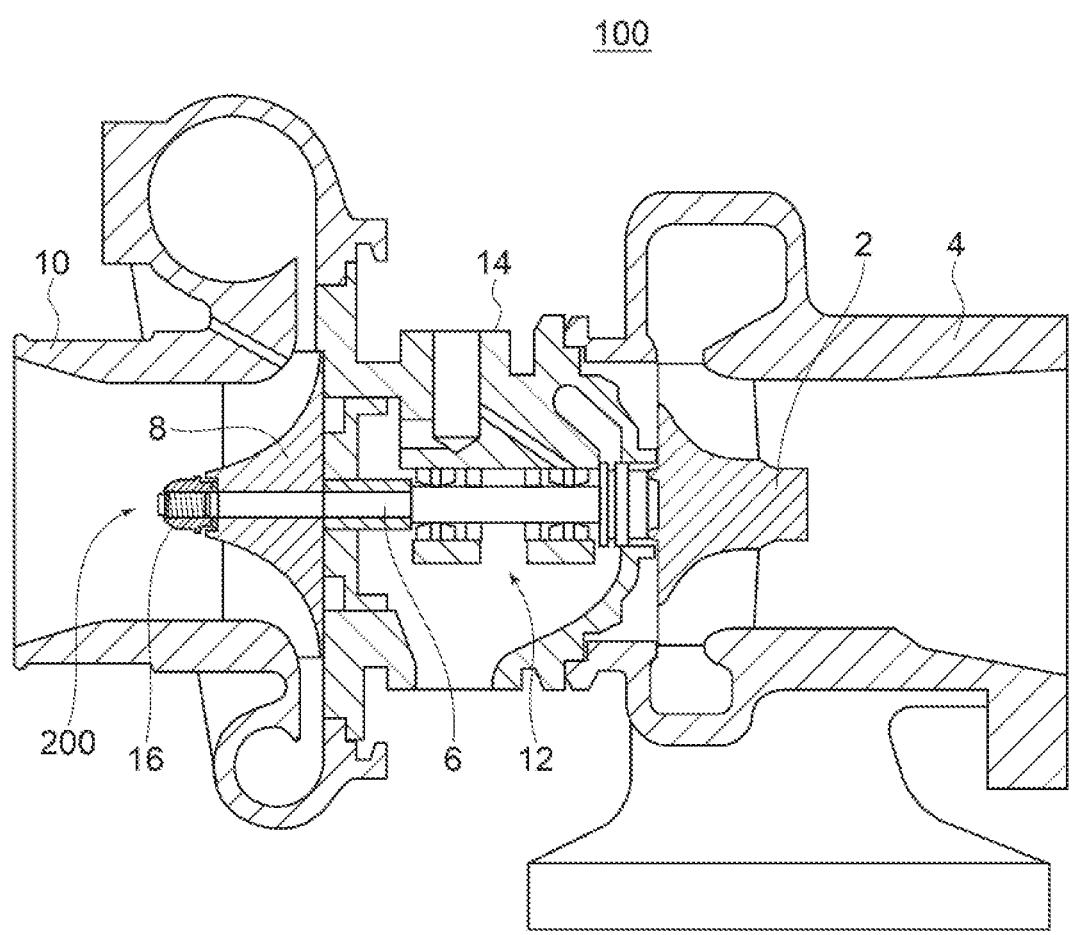
FIG. 1 is a schematic cross-sectional diagram showing a supercharger 100 according to an embodiment.

FIG. 1 is a schematic cross-sectional diagram showing a supercharger 100 according to an embodiment.

As shown in FIG. 1, the supercharger 100 is an exhaust-turbine type supercharger (turbocharger), and is configured to rotate a turbine rotor 2 with exhaust gas of an internal combustion engine (not depicted; diesel engine for a ship, for example) and rotate a compressor impeller 8 with the motoring force of the turbine rotor 2, and thereby compress air to be supplied to the internal combustion engine. The supercharger (turbocharger) 100 includes a turbine rotor 2, a turbine casing 4 housing the turbine rotor 2, a compressor impeller 8 coupled to the turbine rotor 2 via a shaft 6, a compressor casing 10 housing the compressor impeller 8, a bearing device 12 supporting the shaft 6, and a bearing casing 14 housing the bearing device 12. The compressor impeller 8 is fixed to the shaft 6 with a compressor-impeller fixing nut 16, and forms a compressor impeller assembly 200 with the compressor-impeller fixing nut 16 and the shaft 6.

In the following description, the direction of the axial direction of the shaft 6 (direction of the axial direction of the compressor-impeller fixing nut 16) is simply referred to as "axial direction", the radial direction of the shaft 6 (radial direction of the compressor-impeller fixing nut 16) is simply referred to as "radial direction", and the circumferential direction of the shaft 6 (circumferential direction of the compressor-impeller fixing nut 16) is simply referred to as "circumferential direction".

Figure 2:
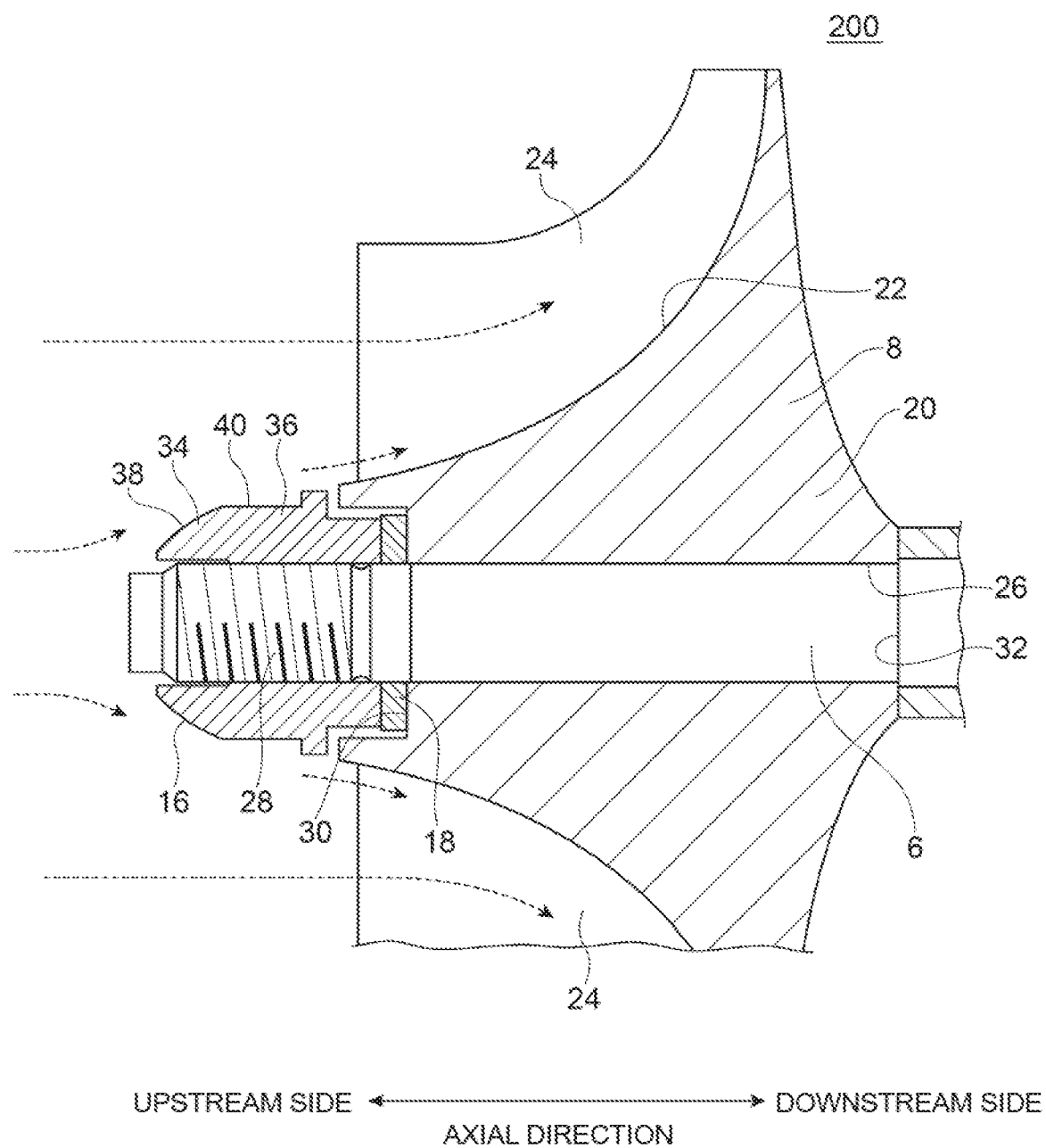
FIG. 2 is a schematic cross-sectional view of a compressor impeller assembly 200 according to an embodiment.

FIG. 2 is a schematic cross-sectional view of a compressor impeller assembly 200 according to an embodiment.

As shown in FIG. 2, the compressor impeller assembly 200 includes a compressor impeller 8, a shaft 6 inserted through the compressor impeller 8, a compressor-impeller fixing nut 16, and a washer 18.

The compressor impeller 8 includes a hub 20 and a plurality of rotor blades 24 disposed on the outer peripheral surface 22 of the hub 20 at intervals in the circumferential direction.

The shaft 6 includes a screw portion 28 which is inserted through an insertion hole 26 of the hub 20 and which protrudes toward the upstream side in the axial direction from the hub 20.

The compressor-impeller fixing nut 16 has a cylindrical shape. The compressor-impeller fixing nut 16 pushes the compressor impeller 8 toward a step portion 32 of the shaft 6 and fixes the compressor impeller 8 to the shaft 6, by engaging with the screw portion 28 and applying a fastening force (axial force) to an end surface 30 on the upstream side of the hub 20 in the axial direction via the washer 18.

Figure 3:
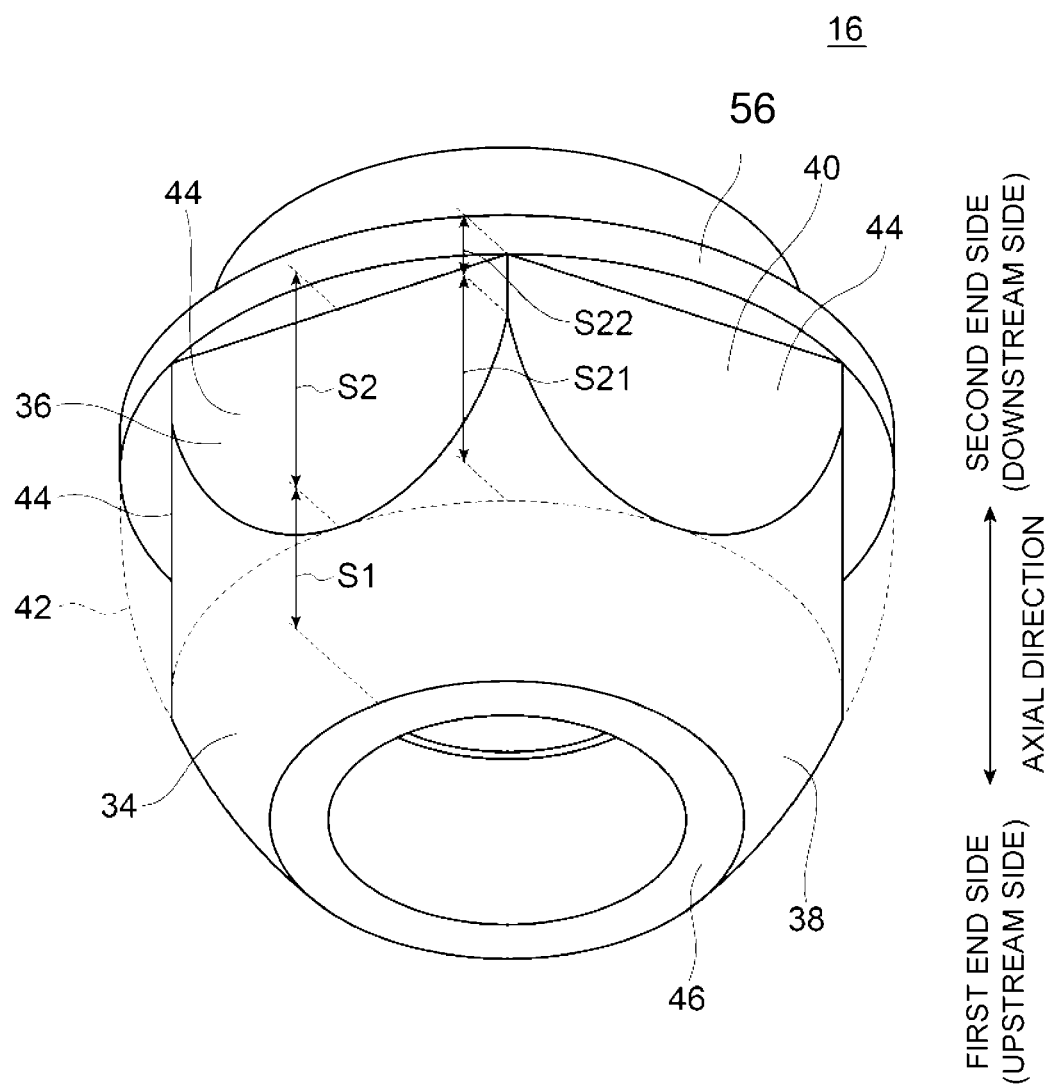
FIG. 3 is a perspective view of a compressor-impeller fixing nut 16.
Figure 4:
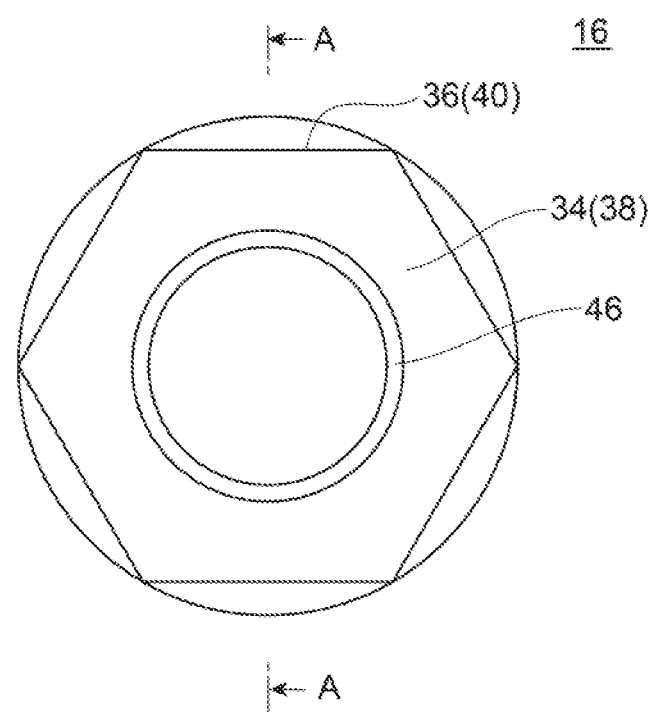
FIG. 4 is a front view of the compressor-impeller fixing nut 16.
Figure 5:
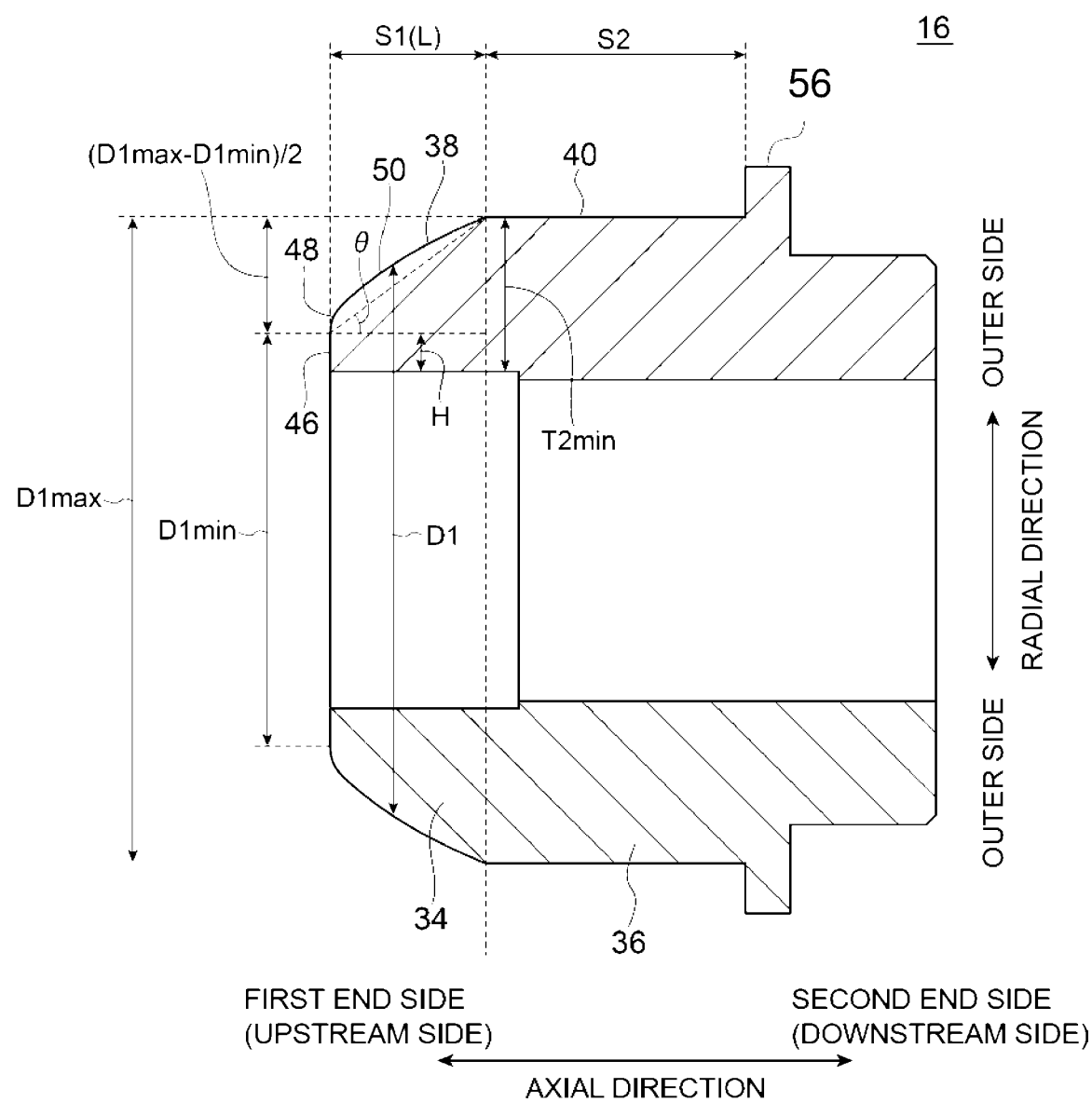
FIG. 5 is an A-A cross-sectional view of the compressor-impeller fixing nut 16 in FIG. 4.

FIG. 3 is a perspective view of a compressor-impeller fixing nut 16. FIG. 4 is a front view of the compressor-impeller fixing nut 16. FIG. 5 is an A-A cross-sectional view of the compressor-impeller fixing nut in FIG. 4.

For instance, as shown in FIGS. 3 and 5, the compressor-impeller fixing nut 16 includes a curved-surface shaped portion 34 disposed in the first range S1 from a first end side (upstream side) in the axial direction, and a nut portion 36 disposed in the second range S2 closer to the second end side (downstream side) from the first range S1 in the axial direction.

For instance, as shown in FIG. 5, the curved-surface shaped portion 34 has a cylindrical shape whose outer diameter D1 increases toward the second end side in the axial direction. The outer shape of the curved-surface shaped portion 34 (shape of the outer peripheral surface 38 in a cross-section orthogonal to the axial direction) has a circular shape. The outer peripheral surface 38 of the curved-surface shaped portion 34 in a cross section along the axial direction has a curved surface shape which protrudes outward in the radial direction. Further, the outer peripheral surface 38 of the curved-surface shaped portion 34 is formed to satisfy an expression $(D1max-D1min)/2<L$, where L is a length of the first range S1 in the axial direction, D1max is a maximum value of the outer diameter D1 of the curved-surface shaped portion 34 in the first range S1, and D1min is a minimum value of the outer diameter D1 of the curved-surface shaped portion 34 in the first range S1. That is, in a cross section along the axial direction, the axial direction and a line connecting opposite ends of the outer peripheral surface 38 of the curved-surface shaped portion 34 forms an angle θ of less than 45 degrees.

Figure 6:
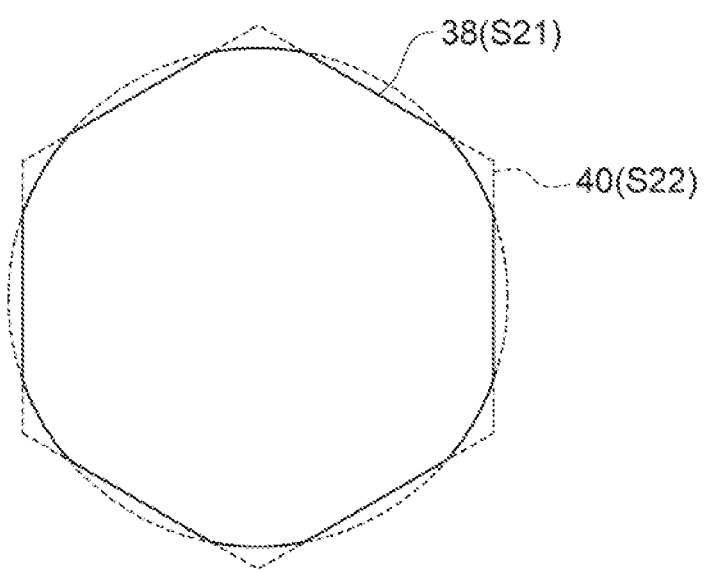
FIG. 6 is a diagram for describing the outer shape of a nut portion 36 in the range S22 (the shape of the outer peripheral surface 40 of the nut portion 36 in a cross section orthogonal to the axial direction).

For instance, as shown in FIG. 3, the outer peripheral surface 40 of the nut portion 36 has a shape obtained by cutting a shape having a virtual outer peripheral surface 42 extended from the outer peripheral surface 38 of the curved-surface shaped portion 34 toward the second end side, at three pairs of parallel flat surfaces 44 (six surfaces in total). That is, as shown in FIG. 6, in a range S21 of the second range S2 that is adjacent to the downstream side of the first range S1, the outer peripheral surface 40 of the nut portion 36 has a shape connecting six arcs and six lines (segments) alternately in the circumferential direction, in a cross-section orthogonal to the axial direction. The six segments include three pairs of parallel sides. Furthermore, in a range S22 of the second range S2 that is adjacent to the downstream side of the range S21, the outer peripheral surface 40 of the nut portion 36 has a regular hexagonal shape in a cross-section orthogonal to the axial direction.

In the compressor impeller assembly 200 including the above compressor-impeller fixing nut 16, the air flowing along the axial direction to the compressor-impeller fixing nut 16 flows along the outer peripheral surface 38 of the curved-surface shaped portion 34 from the first end side of the compressor-impeller fixing nut 16.

Herein, the curved-surface shaped portion 34 is formed to have an outer diameter D1 which increases toward the second end side of the compressor-impeller fixing nut 16 in the axial direction (downstream side in the air flow direction of the compressor impeller assembly 200), and the outer peripheral surface 38 of the curved-surface shaped portion 34 in a cross section along the axial direction has a curved surface shape which protrudes outward in the radial direction. Thus, it is possible to guide the air flowing to the compressor-impeller fixing nut 16 along the axial direction to the compressor impeller 8 smoothly, along the outer peripheral surface 38 of the curved-surface shaped portion 34 from the first end side of the compressor-impeller fixing nut 16 (upstream side in the air flow direction of the compressor impeller assembly 200).

Further, as described above, the curved-surface shaped portion 34 satisfies an expression $(D1max-D1min)/2<L$. That is, in a cross section along the axial direction, the axial direction and a line connecting opposite ends of the outer peripheral surface 38 of the curved-surface shaped portion 34 forms an angle θ of less than 45 degrees. Thus, it is possible to guide the air flowing to the compressor-impeller fixing nut 16 along the axial direction to the compressor impeller even more smoothly, along the outer peripheral surface 38 of the curved-surface shaped portion 34.

Accordingly, with the above compressor-impeller fixing nut 16, it is possible to guide the air flow smoothly to the compressor impeller 8 without using a seal cap as disclosed in Patent Document 1. Thus, it is possible to reduce energy loss of an air flow introduced into the compressor impeller 8 without increasing the complexity of the configuration of the compressor impeller assembly 200. Further, it is possible to reduce the number of components included in the compressor impeller assembly, which makes it possible to reduce the production cost and facilitate management of components.

In an embodiment, as shown in FIG. 5, the outer peripheral surface 38 of the curved-surface shaped portion 34 is formed to satisfy an expression $(D1max-D1min)/2<0.75$ L. More preferably, the outer peripheral surface 38 of the curved-surface shaped portion 34 may be formed to satisfy an expression (D1max−D1min)/2<0.7 L.

With the above compressor-impeller fixing nut 16 satisfying an expression (D1max−D1min)/2<0.75 L, it is possible to reduce the gradient of the outer peripheral surface 38 of the curved-surface shaped portion 34 with respect to the axial direction even further. That is, it is possible to further reduce the angle θ formed between the axial direction and a line connecting opposite ends of the outer peripheral surface 38 of the curved-surface shaped portion 34 in a cross section along the axial direction. Accordingly, it is possible to guide the air flowing to the compressor-impeller fixing nut 16 along the axial direction to the compressor impeller 8 even more smoothly, along the outer peripheral surface 38 of the curved-surface shaped portion 34. Thus, it is possible to enhance the effect to reduce energy loss of an air flow introduced into the compressor impeller 8.

In an embodiment, as shown in FIG. 5, the outer peripheral surface 38 of the curved-surface shaped portion 34 is formed to satisfy an expression D1min/D1max<0.75. More preferably, the outer peripheral surface 38 of the curved-surface shaped portion 34 may be formed to satisfy an expression D1min/D1max<0.7.

With the above compressor-impeller fixing nut 16, the outer peripheral surface 38 having a small gradient with respect to the axial direction as described above is formed over a broader range in the radial direction. Accordingly, it is possible to guide the air flowing to the compressor-impeller fixing nut 16 along the axial direction to the compressor impeller 8 even more smoothly, along the outer peripheral surface 38 of the curved-surface shaped portion 34. Thus, it is possible to enhance the effect to reduce energy loss of an air flow introduced into the compressor impeller 8.

In an embodiment, as shown in FIGS. 3 to 5 for instance, the curved-surface shaped portion 34 includes a vertical end surface 46 connecting to the outer peripheral surface 38 and extending orthogonal to the axial direction, on the first end side of the curved-surface shaped portion 34 with respect to the axial direction.

With the above configuration, when mounting the compressor-impeller fixing nut 16 to the shaft 6, it is possible to make a mark such as a guide line easily on the vertical end surface 46, which makes it possible to understand the angle of rotation of the compressor-impeller fixing nut 16 easily. Thus, it is possible to keep the tightening torque of the compressor-impeller fixing nut 16 within a predetermined range easily, without using a torque measurement device such as a torque wrench.

In an embodiment, as shown in FIG. 5, an expression H/T2min<0.3 is satisfied, where H is the height of the vertical end surface 46 in the radial direction and T2min is the minimum value of the thickness of the nut portion 36 in the radial direction.

With the above configuration, the outer peripheral surface 38 having a small gradient with respect to the axial direction as described above is formed over a broader range in the radial direction. Thus, also with the configuration including the vertical end surface 46, it is possible to guide the air flowing to the compressor-impeller fixing nut 16 along the axial direction to the compressor impeller 8 smoothly, along the outer peripheral surface 38 of the curved-surface shaped portion 34. Further, an expression H/T2min>0.1 may be also satisfied, so that marks such as a guide line can be made easily.

In an embodiment, as shown in FIG. 5 for instance, the outer peripheral surface 38 of the curved-surface shaped portion 34 in a cross section along the axial direction includes a first arc portion 48 connecting to the vertical end surface 46 and having a first curvature radius, and a second arc portion 50 connecting to the first arc portion 48 opposite to the vertical end surface 46 and having a second curvature radius that is greater than the first curvature radius.

With the above configuration, it is possible to smoothly connect the vertical end surface 46 and the second arc portion 50 having a relatively small gradient with respect to the axial direction, via the first arc portion 48 having a relatively large gradient with respect to the axial direction. Accordingly, it is possible to guide air that flows to the compressor-impeller fixing nut 16 along the axial direction to the compressor impeller 8 even more smoothly, along the outer peripheral surface 38 of the curved-surface shaped portion 34.

In an embodiment, as shown in FIG. 5 for instance, the existence range of the first arc portion 48 in the axial direction is narrower than the existence range of the second arc portion 50 in the axial direction.

With the above configuration, the existence range of the second arc portion 50 having a relatively small gradient with respect to the axial direction is larger than the existence range of the first arc portion 48 having a relatively large gradient with respect to the axial direction, and thus it is possible to guide the air flow even more smoothly to the compressor impeller 8 along the outer peripheral surface 38 of the curved-surface shaped portion 34.

Figure 7:
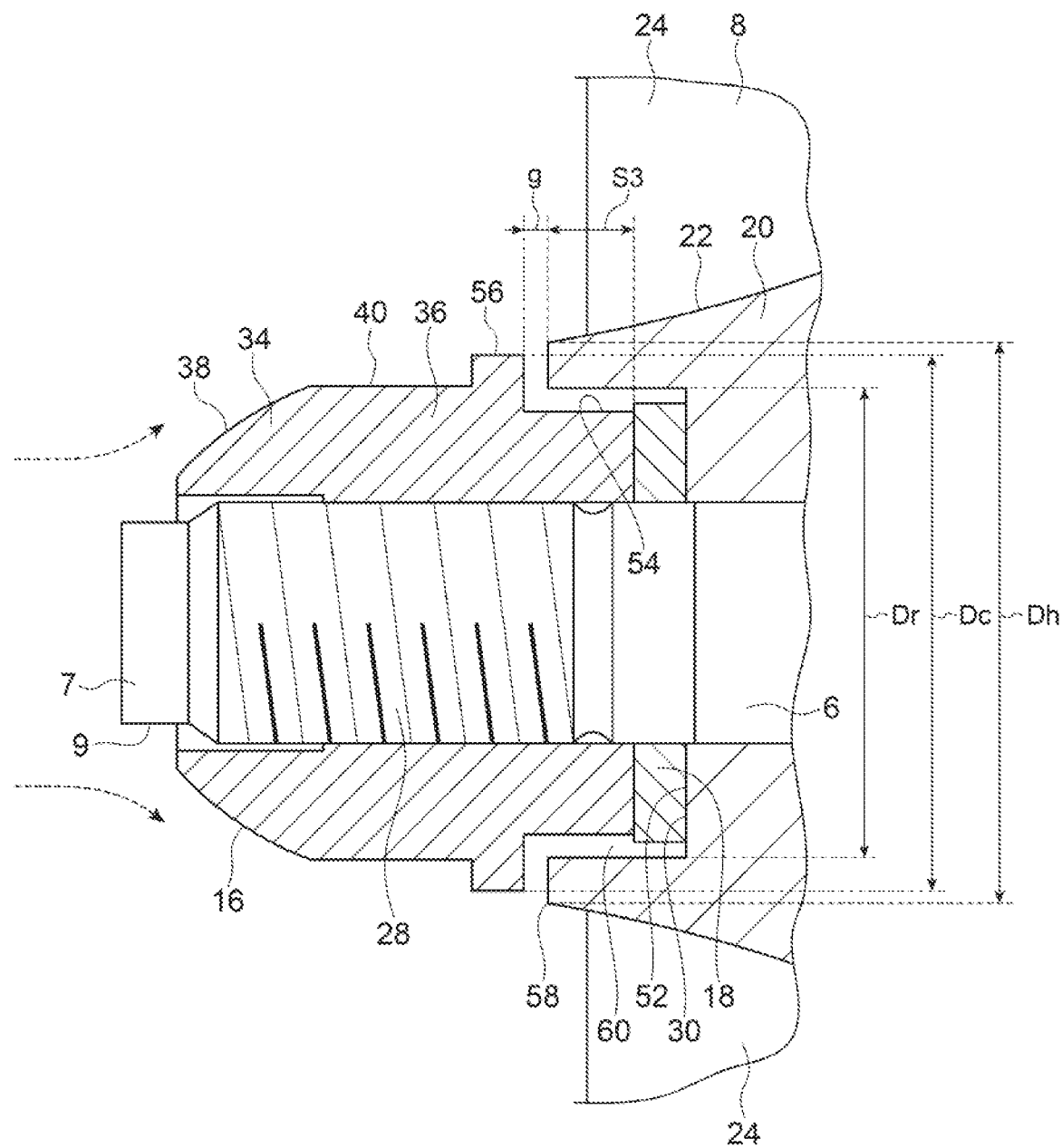
FIG. 7 is a partial enlarged cross-sectional view of the compressor impeller assembly 200 shown in FIG. 2.

FIG. 7 is a partial enlarged view of the compressor impeller assembly 200 shown in FIG. 2.

In an embodiment, as shown in FIG. 7, the tip portion 7 of the shaft 6 protrudes opposite to the compressor impeller 8 from the compressor-impeller fixing nut 16 (toward the upstream side in the air flow direction).

With the above configuration, upon maintenance of the supercharger 100, it is possible to measure the rotational vibration (shaft vibration) of the shaft 6 by causing a displacement sensor to approach, or make contact with, the peripheral surface 9 of the tip portion 7 of the shaft 6 protruding as described above. Further, while a seal cap needs to be removed before measuring the rotational vibration of the shaft if a bag-shaped seal cap is disposed on the tip portion of the shaft as in Patent Document 1, the above configuration makes it no longer necessary to provide the seal cap itself, and thus measurement of the rotational vibration of the shaft 6 is facilitated.

In an embodiment, as shown in FIG. 7 for instance, a recess portion 52 is formed on the end surface 30 on the upstream side of the hub 20 of the compressor impeller 8 with respect to the axial direction. Further, the compressor-impeller fixing nut 16 includes an accommodated portion 54 and a flange portion 56. The accommodated portion 54 is disposed in the first range S3 from the second end side of the compressor-impeller fixing nut 16 in the axial direction, and is accommodated in the recess portion 52. In the axial direction, the accommodated portion 54 has an end surface 58 which is in contact with the washer 18 accommodated in the recess portion 52, and the washer 18 is held between the end surface 58 of the accommodated portion 54 and the end surface 30 of the hub 20 by a fastening force (axial force) of the compressor-impeller fixing nut 16. The flange portion 56 is disposed between the nut portion 36 and the accommodated portion 54 in the axial direction, and has a flange shape protruding outward in the radial direction from the outer peripheral surface 40 of the nut portion 36. Further, the flange portion 56 is formed so as to satisfy an expression Dc>Dr, where Dc is an outer diameter of the flange portion 56 and Dr is an inner diameter of the recess portion 52.

With the above configuration, the accommodated portion 54, which is a part of the compressor-impeller fixing nut 16, is accommodated in the recess portion 52, and thus it is possible to reduce the length of the shaft 6. Further, since the outer diameter Dc of the flange portion 56 is larger than the inner diameter Dr of the recess portion 52, it is possible to suppress entry of air into the space 60 in the recess portion 52 with the flange portion 56, and reduce energy loss of the air flow.

In an embodiment, as shown in FIG. 7 for instance, the flange portion 56 is formed so as to satisfy an expression Dc≤Dh, where Dc is the outer diameter of the flange portion 56, and Dh is an outer diameter of an upstream end 58, with respect to the axial direction, of the outer peripheral surface 22 of the hub 20 in the compressor impeller 8.

With the above configuration, the flange portion 56 does not protrude outward in the radial direction from the upstream end 58 of the outer peripheral surface 22 of the hub 20 in the compressor impeller 8, and thus it is possible to reduce the effect of the flange portion 56 on the air flow that flows toward the rotor blades 24 of the compressor impeller 8 along the axial direction.

In an embodiment, as shown in FIG. 7, a gap 'g' is disposed between the flange portion 56 and the hub 20.

With the above configuration, with the gap 'g', it is possible to suppress generation of stress due to the difference between the thermal expansion amount of the flange portion 56 and the thermal expansion amount of the hub 20. Furthermore, even when the gap 'g' is provided, the inflow of air into the gap 'g' can be suppressed by the flange portion 56 itself.

Embodiments of the present invention were described in detail above, but the present invention is not limited thereto, and various amendments and modifications may be implemented.

Figure 8:
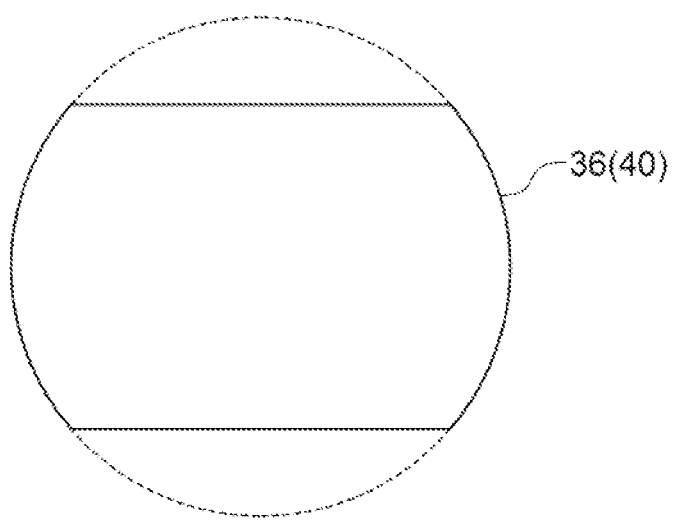
FIG. 8 is a diagram for describing the outer shape of a nut portion according to another embodiment.

For instance, it is sufficient if the outer shape of the nut portion (the shape of the outer peripheral surface of the nut portion in a cross section orthogonal to the axial direction) is a shape that can fastened by a general fastening tool such as a wrench, and the outer shape may include, for instance, a square, or a shape obtained by connecting two parallel sides with arcs protruding outward in the radial direction as shown in FIG. 8. With the outer shape of the nut portion 36 including at least a pair of parallel sides, it is possible to screw the compressor-impeller fixing nut 16 with the screw portion 28 of the shaft 6 by using a general fastening tool such as a wrench.

Furthermore, application of the present invention is not limited to the above described exhaust-turbine type supercharger (turbocharger), and may be a mechanical supercharger for driving a compressor with an electric motor or power extracted from an output shaft of an internal combustion engine via a belt or the like.

DESCRIPTION OF REFERENCE NUMERALS

2 Turbine rotor
4 Turbine casing
6 Shaft
7 Tip portion
8 Compressor impeller
9 Peripheral surface
10 Compressor casing
12 Bearing device
14 Bearing casing
16 Compressor-impeller fixing nut
18 Washer
20 Hub
22, 38, 40 Outer peripheral surface
24 Rotor blade
26 Insertion hole
28 Screw portion
30, 58 End surface
32 Step portion
34 Curved-surface shaped portion
36 Nut portion
42 Virtual outer peripheral surface
44 Flat surface
46 Vertical end surface
48 First arc portion
50 Second arc portion
52 Recess portion
54 Accommodated portion
56 Flange portion
58 Upstream end
60 Space
100 Supercharger
200 Compressor impeller assembly
D1, Dc Outer diameter
Dr Inner diameter
S1 First range
S2 Second range
S3 Third range
S21, S2 Range
g Gap

The invention claimed is:

1. A compressor-impeller fixing nut for fixing a compressor impeller to a shaft, the compressor-impeller fixing nut having a tubular shape, and comprising:
    a curved-surface shaped portion disposed in a first range and extending from a first end side to a second end side in an axial direction, the curved-surface shaped portion having an outer diameter which increases toward the second end side in the axial direction and including an outer peripheral surface having a curved shape which protrudes outward in a radial direction in a cross section along the axial direction, wherein the first range is axially delimited by the first end side and the second end side; and
    a nut portion disposed in a second range extending from the first range in the axial direction, the nut portion having an outer peripheral surface,
    wherein an expression $(D1max-D1min)/2<L$ is satisfied,
    where L is the length of the first range in the axial direction, and D1max is a maximum value and D1min is a minimum value of the outer diameter of the curved-surface shaped portion in the first range.

2. The compressor-impeller fixing nut according to claim 1, wherein an expression $(D1max-D1min)/2<0.75\,L$ is satisfied.

3. The compressor-impeller fixing nut according to claim 1, wherein an expression $D1min/D1max<0.75$ is satisfied.

4. The compressor-impeller fixing nut according to claim 1,
    wherein the curved-surface shaped portion includes, on the first end side in the axial direction, a vertical end surface connecting to the outer peripheral surface of the curved-surface shaped portion and intersecting with the axial direction at a right angle.

5. The compressor-impeller fixing nut according to claim 4, wherein an expression $H/T2min<0.3$ is satisfied, and where H is a height of the vertical end surface in the radial direction, and T2min is a minimum value of a thickness of the nut portion in the radial direction.

6. The compressor-impeller fixing nut according to claim 4,
wherein the outer peripheral surface of the curved-surface shaped portion in a cross section along the axial direction includes: a first arc portion connecting to the vertical end surface and having a first radius of curvature; and a second arc portion connecting to the first arc portion on a side opposite to the vertical end surface and having a second radius of curvature which is greater than the first radius of curvature.

7. The compressor-impeller fixing nut according to claim 6,
wherein a third range of the first arc portion in the axial direction is narrower than a fourth range of the second arc portion in the axial direction.

8. The compressor-impeller fixing nut according to claim 1,
further comprising a flange portion extending from the nut portion in the axial direction, the flange portion protruding outward in the radial direction.

9. The compressor-impeller fixing nut according to claim 1,
wherein the outer peripheral surface of the nut portion in a cross section orthogonal to the axial direction includes at least a pair of sides which are parallel to one another.

10. A compressor impeller assembly, comprising:
a compressor impeller;
a shaft inserted through a hub of the compressor impeller, the shaft including a screw portion protruding toward an upstream side of the compressor impeller in an axial direction from the hub of the compressor impeller; and
the compressor-impeller fixing nut according to claim 1, configured to fix the compressor impeller to the shaft by being screwed with the screw portion.

11. The compressor impeller assembly according to claim 10,
wherein a tip portion of the shaft protrudes opposite to the compressor impeller, from the compressor-impeller fixing nut.

12. The compressor impeller assembly according to claim 10,
wherein a recess portion is formed on an upstream end surface of the hub of the compressor impeller with respect to an axial direction,
wherein the compressor-impeller fixing nut includes:
an accommodated portion disposed in a third range extending from the second end side in the axial direction and accommodated in the recess portion; and
a flange portion disposed between the nut portion and the accommodated portion in the axial direction and protruding outward in the radial direction, and
wherein an expression Dc>Dr is satisfied, where Dc is an outer diameter of the flange portion and Dr is an inner diameter of the recess portion.

13. The compressor impeller assembly according to claim 12,
wherein an expression Dc≤Dh is satisfied, where Dh is an outer diameter of an upstream end, with respect to the axial direction, of an outer peripheral surface of the hub in the compressor impeller.

14. The compressor impeller assembly according to claim 12, wherein a gap is disposed between the flange portion and the hub.

15. A supercharger comprising the compressor impeller assembly according to claim 10.

* * * * *